United States Patent
Sohn et al.

(10) Patent No.: US 9,870,619 B2
(45) Date of Patent: Jan. 16, 2018

(54) ELECTRONIC DEVICE AND METHOD FOR SYNTHESIZING CONTINUOUSLY TAKEN IMAGES

(71) Applicant: Samsung Electronics Co., Ltd., Suwon-si, Gyeonggi-do (KR)

(72) Inventors: Jae-Sik Sohn, Suwon-si (KR); Ki-Huk Lee, Yongin-si (KR); Young-Kwon Yoon, Seoul (KR); Woo-Yong Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 14/209,037

(22) Filed: Mar. 13, 2014

(65) Prior Publication Data
US 2014/0270373 A1  Sep. 18, 2014

(30) Foreign Application Priority Data
Mar. 14, 2013  (KR) .................. 10-2013-0027541

(51) Int. Cl.
| G06K 9/00 | (2006.01) |
| G06T 7/20 | (2017.01) |
| G06T 11/00 | (2006.01) |

(52) U.S. Cl.
CPC .............. G06T 7/20 (2013.01); G06T 11/001 (2013.01)

(58) Field of Classification Search
CPC .................................................. H04N 5/2625
See application file for complete search history.

(56) References Cited

U.S. PATENT DOCUMENTS

| 7,466,356 B2* | 12/2008 | Hofer ................. H04N 5/23212 348/169 |
| 9,648,238 B2* | 5/2017 | Takahashi .......... H04N 5/23254 |
| 2004/0096085 A1* | 5/2004 | Matsumoto ........ A63B 24/0003 382/107 |
| 2006/0244917 A1* | 11/2006 | Weisgerber ............ G03B 21/40 352/84 |
| 2008/0166022 A1* | 7/2008 | Hildreth .................. G06F 3/017 382/107 |
| 2009/0135257 A1* | 5/2009 | Takagi ................. G11B 27/034 348/207.2 |
| 2009/0201382 A1* | 8/2009 | Makino ................ H04N 5/2625 348/220.1 |
| 2009/0208062 A1* | 8/2009 | Sorek ..................... H04N 5/232 382/107 |

(Continued)

FOREIGN PATENT DOCUMENTS

KR    10-2010-0120982 A    11/2010

OTHER PUBLICATIONS

Authors unknown, "How do I combine multiple exposures for action shots?", http://photo.stackexchange.com/questions/12233/how-do-i-combine-multiple-exposures-for-action-shots, 2011, p. 1-7.*

*Primary Examiner* — Gandhi Thirugnanam
(74) *Attorney, Agent, or Firm* — Jefferson IP Law, LLP

(57) ABSTRACT

An operation method of an electronic device is provided. The method includes detecting motion objects in each of two or more continuously captured images, determining whether the detected motion objects are synthesizable for use as wallpaper, and providing feedback according to whether the detected motion objects are synthesizable for use as wallpaper.

6 Claims, 11 Drawing Sheets

(56) References Cited

U.S. PATENT DOCUMENTS

| | | | |
|---|---|---|---|
| 2009/0232416 A1* | 9/2009 | Murashita | G06T 7/20 382/294 |
| 2009/0262218 A1* | 10/2009 | Makii | G03B 15/08 348/239 |
| 2009/0324100 A1* | 12/2009 | Kletter | G06K 9/00442 382/217 |
| 2010/0039447 A1* | 2/2010 | Nakao | H04N 1/387 345/634 |
| 2010/0157085 A1* | 6/2010 | Sasaki | H04N 5/232 348/222.1 |
| 2010/0172641 A1* | 7/2010 | Sasaki | H04N 5/232 396/265 |
| 2010/0177208 A1* | 7/2010 | Tamaru | G06T 7/0028 348/222.1 |
| 2011/0043639 A1* | 2/2011 | Yokohata | H04N 5/2625 348/169 |
| 2011/0050722 A1* | 3/2011 | Muraki | G09G 5/393 345/620 |
| 2011/0157423 A1* | 6/2011 | Ando | G06T 11/00 348/231.6 |
| 2011/0187884 A1* | 8/2011 | Kondo | H04N 5/228 348/222.1 |
| 2011/0304636 A1* | 12/2011 | Tsai | G06T 11/001 345/522 |
| 2012/0002112 A1* | 1/2012 | Huang | H04N 5/2625 348/579 |
| 2012/0105657 A1* | 5/2012 | Yokohata | H04N 5/2257 348/208.4 |
| 2012/0194703 A1* | 8/2012 | Bilcu | H04N 5/235 348/231.99 |
| 2012/0230606 A1* | 9/2012 | Sugiyama | H04N 1/3876 382/284 |
| 2012/0236027 A1* | 9/2012 | Ogata | G06F 3/04883 345/629 |
| 2012/0242851 A1* | 9/2012 | Fintel | H04N 5/23222 348/221.1 |
| 2012/0242853 A1* | 9/2012 | Jasinski | H04N 5/23232 348/222.1 |
| 2012/0243802 A1* | 9/2012 | Fintel | H04N 5/2625 382/284 |
| 2013/0016176 A1* | 1/2013 | Hines | H04N 7/14 348/14.08 |
| 2013/0016878 A1* | 1/2013 | Pan | G06K 9/4652 382/103 |
| 2013/0051620 A1* | 2/2013 | Endo | G06T 7/2033 382/103 |
| 2013/0063625 A1* | 3/2013 | Yamanaka | G06K 9/36 348/239 |
| 2013/0136364 A1* | 5/2013 | Kobayashi | G06T 5/009 382/195 |
| 2013/0188873 A1* | 7/2013 | Sasaki | H04N 5/232 382/195 |
| 2013/0208164 A1* | 8/2013 | Cazier | H04N 5/3572 348/333.04 |
| 2013/0314557 A1* | 11/2013 | Furukawa | H04N 5/225 348/208.1 |
| 2014/0270373 A1* | 9/2014 | Sohn | G06T 11/001 382/103 |
| 2014/0325439 A1* | 10/2014 | Sohn | G06F 3/0482 715/810 |
| 2014/0333818 A1* | 11/2014 | Sohn | H04N 5/23293 348/333.05 |
| 2015/0062381 A1* | 3/2015 | Na | H04N 5/23293 348/239 |
| 2015/0229850 A1* | 8/2015 | Lee | H04N 5/2625 348/220.1 |
| 2015/0317519 A1* | 11/2015 | Gurbuz | G06K 9/48 382/103 |
| 2016/0100103 A1* | 4/2016 | Takahashi | G06T 5/50 348/222.1 |
| 2016/0162754 A1* | 6/2016 | Takagi | H04N 5/23248 382/224 |

\* cited by examiner

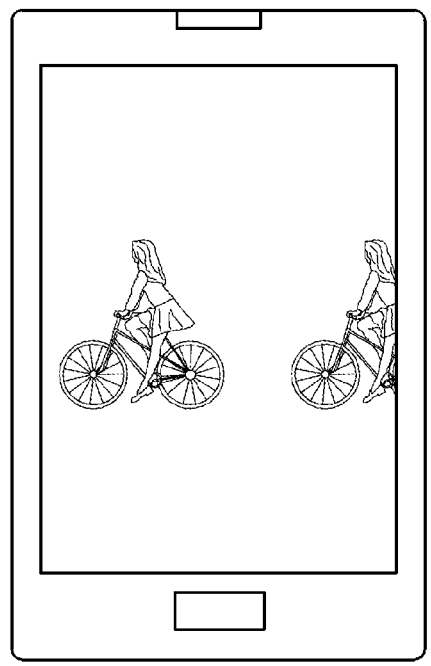
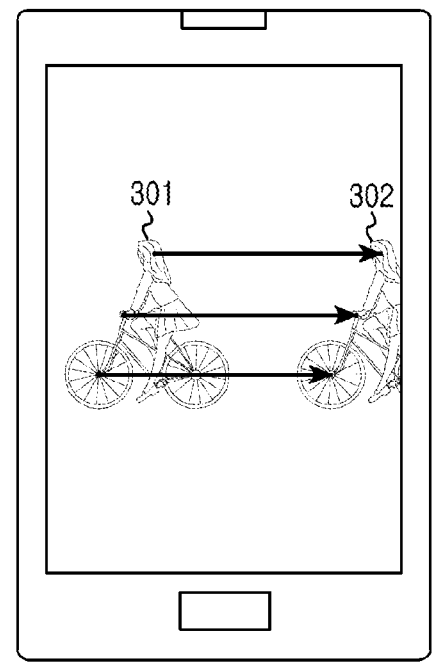
FIG.3A  FIG.3B
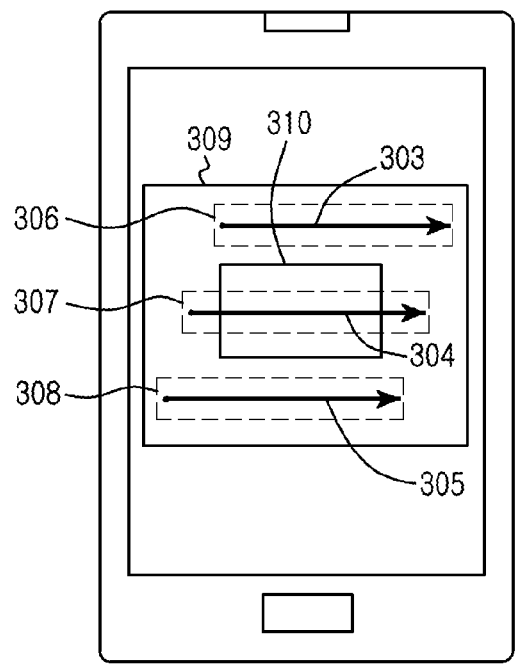
FIG.3C  FIG.3D

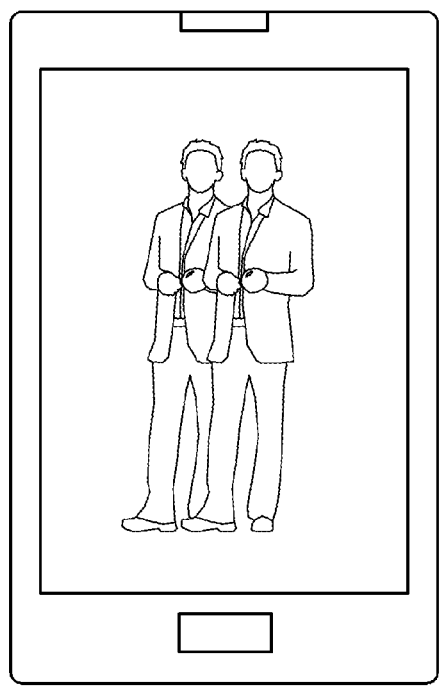 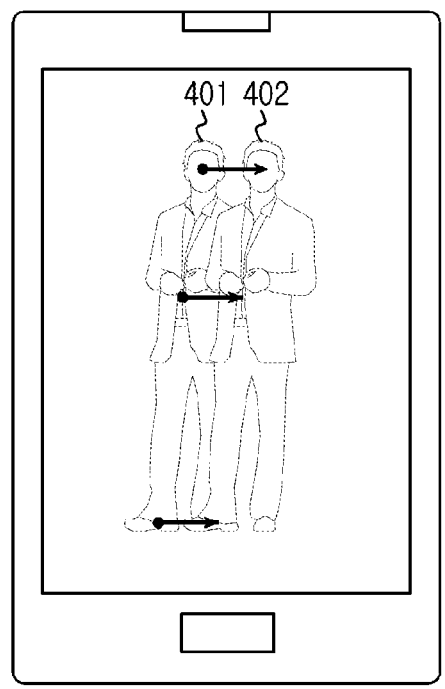
FIG.4A    FIG.4B
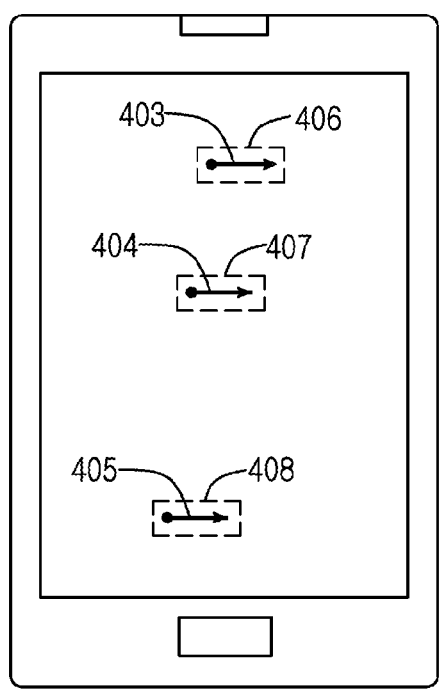 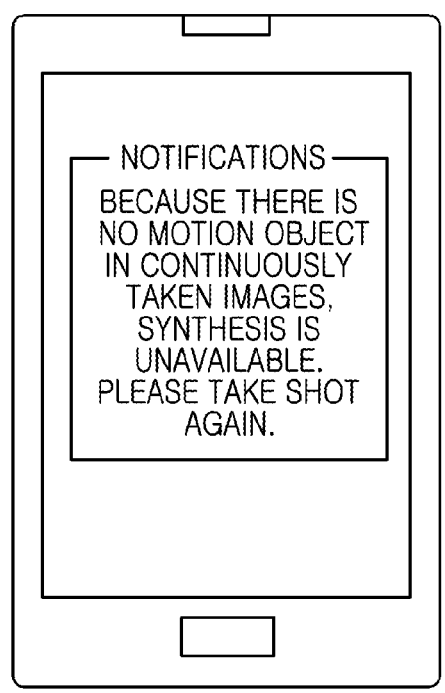
FIG.4C    FIG.4D

ELECTRONIC DEVICE AND METHOD FOR SYNTHESIZING CONTINUOUSLY TAKEN IMAGES

CROSS-REFERENCE TO RELATED APPLICATION(S)

This application claims the benefit under 35 U.S.C. § 119(a) of a Korean patent application filed on Mar. 14, 2013 in the Korean Intellectual Property Office and assigned Serial No. 10-2013-0027541, the entire disclosure of which is hereby incorporated by reference.

TECHNICAL FIELD

The present disclosure relates to an electronic device and method for synthesizing images.

BACKGROUND

Electronic devices are now provided with a variety of advanced functions. For example, electronic devices are now able to take a picture by capturing an image, and are able to capture a movie by continuously capturing images. Moreover, electronic devices are now capable of synthesizing continuously captured images for use as wallpaper for the electronic device, thus satisfying the desires of users.

However, an electronic device of the related art has a problem in that it is unable to provide a clear image to a user because it lacks the ability to determine the effectiveness of the synthesis of continuously captured images. For example, the electronic device of the related art fails to provide a clear image to the user in cases where there are two or more objects in motion in continuously captured images, where an object in motion has a large size, where there is no object in motion, where the electronic device is shaken, and the like.

Accordingly, there is a need for an apparatus and method capable of determining the effectiveness of synthesis of continuously captured images and providing a user with feedback according to whether the image synthesis is possible in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method capable of determining the effectiveness of synthesis of continuously captured images and providing an image of a higher quality to a user, thereby satisfying various desires of the user in an electronic device.

Another aspect of the present disclosure is to provide an apparatus and method capable of, if it is determined that the synthesis will not be effective, instructing a user to capture the image again, thereby improving a user's convenience in an electronic device.

A further aspect of the present disclosure is to provide an apparatus and method capable of selectively deleting a motion object from a synthesized image, thereby satisfying various desires of a user in an electronic device.

The above and other aspects are achieved by providing an electronic device and method for synthesizing continuously captured images.

In accordance with an aspect of the present disclosure, a method for synthesizing continuously captured images in an electronic device is provided. The method includes detecting a motion object in each of two or more continuously captured images, determining whether the detected motion objects are synthesizable for use as wallpaper, and providing feedback according to whether the detected motion objects are synthesizable for use as wallpaper.

The method may further include receiving an input of an image synthesis instruction of instructing to synthesize the motion objects for use as wallpaper and, to detect the motion objects, receiving an input of a continuous shot instruction of instructing to capture the two or more images.

Determining whether the detected motion objects are synthesizable for use as wallpaper may include extracting motion vectors of two motion objects among the detected motion objects, determining whether the magnitudes and directions of the extracted motion vectors of the motion objects are located within set ranges, and, if it is determined that the magnitudes and directions of the motion vectors of the motion objects are located out of the set ranges, determining that there are plural motion objects in the continuously captured images and confirming that the two motion objects are not synthesizable for use as wallpaper and, if it is determined that the magnitudes and directions of the motion vectors of the motion objects are located within the set ranges, determining that there is a single motion object in the continuously captured images and confirming that the two motion objects are synthesizable for use as wallpaper.

Determining whether the detected motion objects are synthesizable for use as wallpaper may include extracting motion vectors of two motion objects among the detected motion objects, extracting motion vectors whose magnitudes and directions are located within set ranges, from the extracted motion vectors, extracting an area including the extracted motion vectors located within the set ranges, and, if it is determined that the extracted area is equal to or is greater than a set area, confirming that the two motion objects are not synthesizable for use as wallpaper and, if it is determined that the extracted area is less than the set area, confirming that the two motion objects are synthesizable for use as wallpaper.

Determining whether the detected motion objects are synthesizable for use as wallpaper may include extracting motion vectors of two motion objects among the detected motion objects and, if it is determined that the magnitudes of the extracted motion vectors are less than set magnitudes, determining that there is no motion object in the continuously captured images and confirming that the two motion objects are not synthesizable for use as wallpaper and, if it is determined that the magnitudes of the extracted motion vectors are equal to or are greater than the set magnitudes, determining that there are the motion objects in the continuously captured images and confirming that the two motion objects are synthesizable for use as wallpaper.

Determining whether the detected motion objects are synthesizable for use as wallpaper may include extracting motion vectors of two fixed objects excepting the detected motion objects and, if it is determined that the magnitudes and directions of the extracted motion vectors are located out of set ranges, confirming that the two fixed objects are not synthesizable for use as wallpaper and, if it is determined that the magnitudes and directions of the extracted motion vectors are located within the set ranges, confirming that the two fixed objects are synthesizable for use as wallpaper.

Determining whether the detected motion objects are synthesizable for use as wallpaper may include, if it is determined by a location sensing sensor that a location change between a time point of starting a continuous shot and a time point of ending the continuous shot is equal to or is greater than a threshold value, confirming that the detected motion objects are not synthesizable for use as wallpaper and, if it is determined that the location change between the time point of starting the continuous shot and the time point of ending the continuous shot is less than the threshold value, confirming that the detected motion objects are synthesizable for use as wallpaper.

Providing the feedback according to whether the detected t motion objects are synthesizable for use as wallpaper may include, if it is determined that the detected motion objects are not synthesizable for use as wallpaper, providing feedback that synthesis is unavailable.

Providing the feedback according to whether the detected motion objects are synthesizable for use as wallpaper may include, if it is determined that the detected motion objects are synthesizable for use as wallpaper, synthesizing the detected motion objects for use as wallpaper, and displaying a synthesis image synthesizing the detected motion objects for use as wallpaper.

The method may further include, if it is determined that the detected motion objects are synthesizable for use as wallpaper, displaying two or more images synthesizable for use as wallpaper among the continuously captured images, receiving a selection of two or more images among the displayed two or more images, extracting a motion object from each of the selected two or more images, synthesizing the extracted motion objects for use as wallpaper, and displaying a synthesized image.

The method may further include displaying, in a set region of the synthesized image, the two or more images synthesizable for use as wallpaper among the continuously captured images, receiving a selection of at least one image among the displayed two or more images, and deleting a motion object included in the selected at least one image, from the synthesized image.

The method may further include displaying, in a set region of the synthesized image, the two or more images synthesizable for use as wallpaper among the continuously captured images, receiving a selection of at least one image among the displayed two or more images, and adding a motion object included in the selected at least one image, to the synthesized image.

In accordance with another aspect of the present disclosure, an electronic device for synthesizing continuously captured images is provided. The device includes a processor unit and a touch screen. The processor unit detects motion objects in two or more continuously captured images, and determines whether the detected motion objects are synthesizable for use as wallpaper. The touch screen provides feedback according to whether the detected motion objects are synthesizable for use as wallpaper.

The touch screen may receive an input of an image synthesis instruction of instructing to synthesize the motion objects for use as wallpaper and, to detect the motion objects, receive an input of a continuous shot instruction of instructing to take the two or more images to detect the motion objects.

The processor unit may extract motion vectors of two motion objects among the detected motion objects, determine whether the extracted motion vectors of the motion objects are located within set ranges and, if it is determined that the motion vectors of the motion objects are located within the set ranges, determine that there is a single motion object in the continuously captured images and confirm that the two motion objects are synthesizable for use as wallpaper and, if it is determined that the motion vectors of the motion objects are located out of the set ranges, determine that there are plural motion objects in the continuously captured images and confirm that the two motion objects are not synthesizable for use as wallpaper.

The processor unit may extract motion vectors of two motion objects among the detected motion objects, extract motion vectors whose magnitudes and directions are located within set ranges, from the extracted motion vectors, extract an area including the extracted motion vectors located within the set ranges and, if it is determined that the extracted area is equal to or is greater than a set area, confirm that the two motion objects are not synthesizable for use as wallpaper and, if it is determined that the extracted area is less than the set area, confirm that the two motion objects are synthesizable for use as wallpaper.

The processor unit may extract motion vectors of two motion objects among the detected motion objects and, if it is determined that the magnitudes of the extracted motion vectors are less than set magnitudes, determine that there is no motion object in the continuously captured images and confirm that the two motion objects are not synthesizable for use as wallpaper and, if it is determined that the magnitudes of the extracted motion vectors are equal to or are greater than the set magnitudes, determine that there are the motion objects in the continuously captured images and confirm that the two motion objects are synthesizable for use as wallpaper.

The processor unit may extract motion vectors of two fixed objects excepting the detected motion objects and, if it is determined that the magnitudes and directions of the extracted motion vectors are located out of set ranges, confirm that the two fixed objects are not synthesizable for use as wallpaper and, if it is determined that the magnitudes and directions of the extracted motion vectors are located within the set ranges, confirm that the two fixed objects are synthesizable for use as wallpaper.

If it is determined by a location sensing sensor that a location change between a time point of starting a continuous shot and a time point of ending the continuous shot is equal to or is greater than a threshold value, the processor unit may confirm that the detected motion objects are not synthesizable for use as wallpaper and, if it is determined that the location change between the time point of starting the continuous shot and the time point of ending the continuous shot is less than the threshold value, confirm that the detected motion objects are synthesizable for use as wallpaper.

If it is determined that the detected motion objects are not synthesizable for use as wallpaper, the touch screen may provide feedback that synthesis is unavailable.

If it is determined that the detected motion objects are synthesizable for use as wallpaper, the processor unit may synthesize the detected motion objects for use as wallpaper, and the touch screen may display a synthesis image synthesizing the detected motion objects for use as wallpaper.

If it is determined that the detected motion objects are synthesizable for use as wallpaper, the touch screen may display two or more images synthesizable for use as wallpaper among the continuously captured images, receive a selection of two or more images among the displayed two or more images, and synthesize extracted two or more objects for use as wallpaper and display a synthesized image, and the processor unit may extract the motion objects included in the selected two or more images, respectively.

The touch screen may display, in a set region of the synthesized image, the two or more images synthesizable for use as wallpaper among the continuously captured images, and receive a selection of at least one image among the displayed two or more images, and the processor unit may delete a motion object included in the selected at least one image, from the synthesized image.

The touch screen may display, in the set region of the synthesized image, the two or more images synthesizable for use as wallpaper among the continuously captured images, and receive a selection of at least one image among the displayed two or more images, and the processor unit may add a motion object included in the selected at least one image, to the synthesized image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, 3C and 3D illustrate determining the effectiveness of image synthesis according to a second embodiment of the present disclosure;

FIGS. 4A, 4B, 4C and 4D illustrate determining the effectiveness of image synthesis according to a third embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces FIGS. 1A and 1B illustrate providing feedback according to whether continuously captured images are synthesizable for setting as wallpaper according to an embodiment of the present disclosure.

Figure 1A:
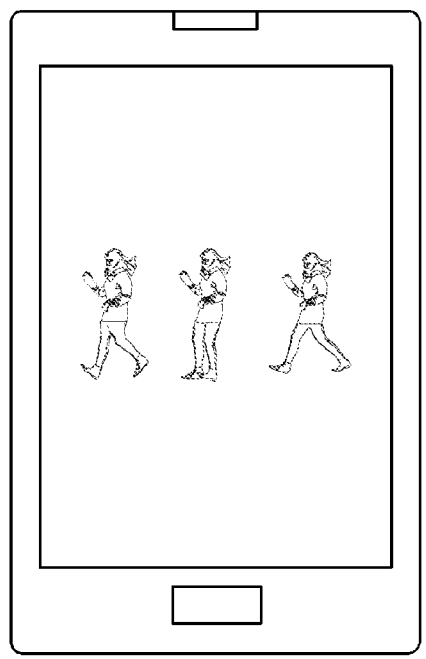
FIGS. 1A and 1B illustrate providing feedback of whether continuously captured images are synthesizable to set a wallpaper according to an embodiment of the present disclosure.
Figure 1B:
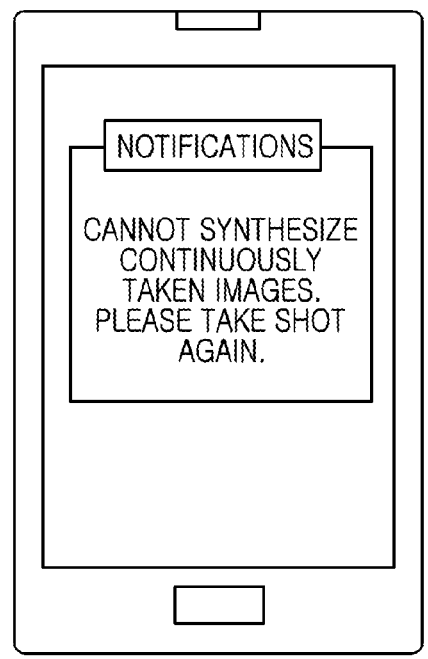

Referring to FIGS. 1A and 1B, it is assumed that an electronic device according to an embodiment of the present disclosure can receive an input regarding an image synthesis instruction.

Here, the image synthesis instruction can be defined as an instruction to synthesize two or more motion objects for use as wallpaper. In more detail, the image synthesis instruction can be defined as an instruction to provide feedback according to whether two or more motion objects detected from continuously captured images are synthesizable for use as wallpaper on a display of the electronic device. To detect the two or more motion objects, the electronic device can receive an input of a continuous shot instruction to continuously capture two or more images.

The electronic device receiving the input of the continuous shot instruction and performing a continuous shot can detect motion objects from the two or more captured images. The electronic device can also determine whether the detected motion objects are objects that are effective for image synthesis. Here, the determining of whether the motion objects are objects that are effective for image synthesis may include determining whether the detected motion objects are synthesizable for use as wallpaper.

For example, the electronic device can determine the effectiveness of image synthesis by determining whether there are plural motion objects, whether a motion object is bigger than a set size, whether no motion object is detected, whether a location of the electronic device is changed equal to or greater than a threshold value (i.e., whether the electronic device is shaken), etc.

If determining that image synthesis would be effective as a result of detecting the motion objects in the continuously captured images, the electronic device can extract the two or more motion objects from the continuously captured images and synthesize the extracted two or more motion objects for use as wallpaper.

For instance, as illustrated in FIG. 1A, if receiving an input of an image synthesis instruction and receiving an input of a continuous shot instruction, the electronic device can determine the effectiveness of synthesis of continuously captured images of one or more motion objects. If the effectiveness of image synthesis of the continuously captured images is recognized in the electronic device, the electronic device can extract each of the motion objects from the continuously captured images for which the effectiveness of image synthesis is recognized, and synthesize the extracted motion objects for use as wallpaper.

Here, the wallpaper may be a screen designated by a user or a wallpaper of the first image among the continuously captured images. As an example, the wallpaper may be the first image having clear image synthesis.

On the other hand, if the effectiveness of image synthesis is not recognized as a result of determining the effectiveness of image synthesis in the electronic device, the electronic device can provide feedback that the motion objects included in the continuously captured images are not synthesizable for use as wallpaper.

For example, in a case where the effectiveness of image synthesis is not recognized in the electronic device, i.e., in a case where it is determined that there are plural motion objects, in a case where a motion object is bigger than a set size, in a case where no motion object is detected, in a case where a location of the electronic device is changed equal to or greater than a threshold value, etc., the electronic device can provide feedback that the motion objects included in the continuously captured images are not synthesizable for use as wallpaper.

As illustrated in FIG. 1B, feedback that image synthesis is unavailable from the electronic device can include the displaying of a notification message on a touch screen of the electronic device or the providing of a voice message through a speaker of the electronic device.

The electronic device of the related art can include each motion object included in continuously captured images in one image for use as wallpaper. However, the electronic device of the related art displays the plural images overlapping one another or otherwise unclearly because it is not able to determine the effectiveness of image synthesis, thus causing a failure to provide a clear image.

An electronic device according to the present disclosure has an advantage in that, because it has previously determined the effectiveness of image synthesis, it is capable of automatically synthesizing images for which the effectiveness of synthesis is recognized, for use as wallpaper, and providing an image of a much higher quality. In addition, if it is determined that continuously captured images are not synthesizable in the electronic device, the electronic device can provide a user with feedback that the continuously captured images are not synthesizable, and instruct the user to capture continuous images again.

FIGS. 2A to 2D illustrate determining the effectiveness of image synthesis according to an embodiment of the present disclosure. In the following description, it is assumed that an electronic device continuously captures a scene in which someone dribbles a basketball, and starts determining the effectiveness of image synthesis by determining if three continuously captured images are synthesizable for use as wallpaper.

Figure 2A:
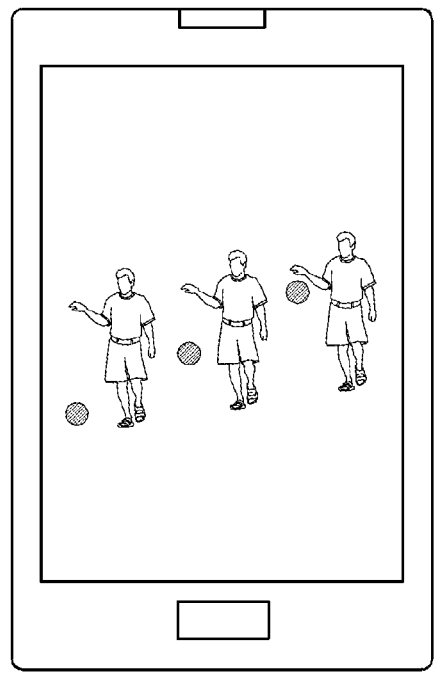
FIGS. 2A, 2B, 2C, and 2D illustrate determining the effectiveness of image synthesis according to a first embodiment of the present disclosure.
Figure 2B:
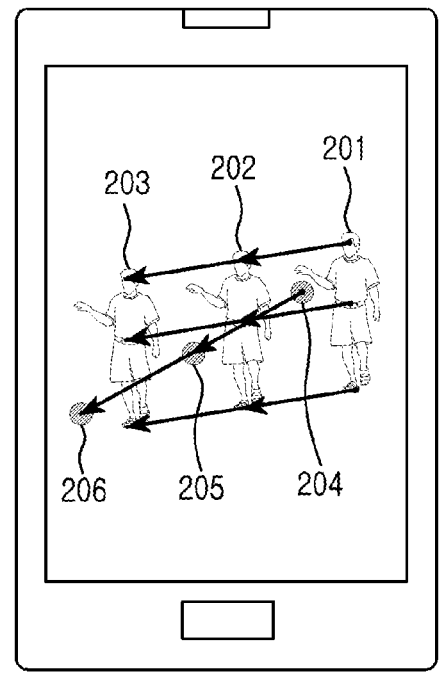

Referring to FIG. 2A, to determine the effectiveness of image synthesis, the electronic device can detect a motion object in each of three continuously captured images. As illustrated in FIG. 2B, to detect motion vectors of a person who is a detected motion object, the electronic device can set a vector having a magnitude and a direction, which starts from a set 1st region (e.g., head, breast, leg, etc.) of a person 201 of the first image and ends at a set 2nd region (e.g., head, breast, leg, etc.) of a person 202 of the second image.

In the same method, to detect the motion vectors of the person who is the detected motion object, the electronic device can set a vector having a magnitude and a direction, which starts from a set 1st region (e.g., head, breast, leg, etc.) of the person 202 of the second image and ends at a set 2nd region (e.g., head, breast, leg, etc.) of a person 203 of the third image.

Also, to detect motion vectors of a basketball, which is a detected motion object, the electronic device can set a vector having a magnitude and a direction, which starts from a set 1st region (e.g., the center of the basketball) of a basketball 204 of the first image and ends at a set 2nd region (e.g., the center of the basketball) of a basketball 205 of the second image.

In the same method, to detect the motion vectors of the basketball which is the detected motion object, the electronic device can set a vector having a magnitude and a direction, which starts from a set 1st region (e.g., the center of the basketball) of the basketball 205 of the second image and ends at a set 2nd region (e.g., the center of the basketball) of a basketball 206 of the third image.

Figure 2C:
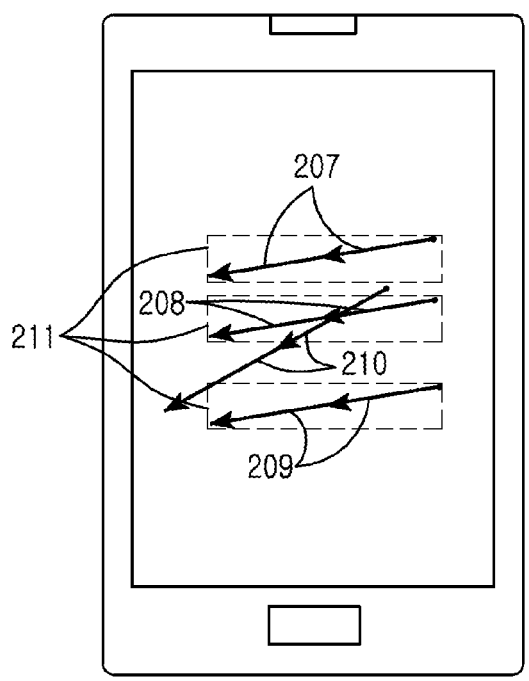

As illustrated in FIG. 2C, the electronic device can extract motion vectors 207, 208, and 209 and a motion vector 210 from the two motion objects, i.e., the person and the basketball, respectively.

The electronic device can determine if the magnitudes and directions of the extracted person motion vectors 207, 208, and 209 and basketball motion vector 210 are each located within a set range 211. In an embodiment, the person motion vectors 207, 208, and 209 are each located within the set range 211, but the basketball motion vector 210 is not located within the set range 211. Accordingly, the electronic device can determine the person and the basketball as different objects (i.e., not the same object) and confirm that there are two motion objects in the continuously captured images.

Figure 2D:
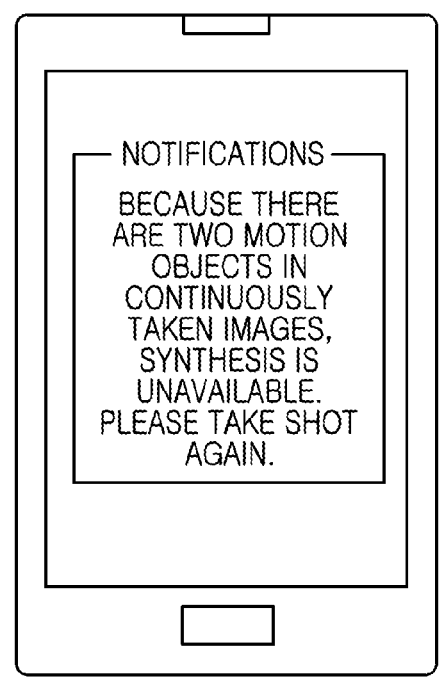

As illustrated in FIG. 2D, the electronic device can determine that another video (i.e., continuously captured images) must be captured because there are two motion objects in the continuously captured images. Also, the electronic device can provide feedback to a user that image synthesis is unavailable. For example, the electronic device can display a notification message of "Because there are two motion objects in continuously captured images, synthesis is unavailable. Please take shot again." That is, the electronic device may display the notification message on a touch screen of the electronic device, or play back the aforementioned message through a speaker provided in the electronic device.

FIGS. 3A to 3D illustrate determining the effectiveness of image synthesis according to a second embodiment of the present disclosure. In the following, it is assumed that an electronic device continuously shoots a person riding a bicycle, and starts determining the effectiveness of image synthesis by determining if two continuously captured images are synthesizable for use as wallpaper.

Referring to FIG. 3A, to determine the effectiveness of image synthesis, the electronic device can detect each of two continuously captured images. As illustrated in FIG. 3B, to detect motion vectors of a person riding a bicycle who is a detected motion object, the electronic device can set a vector having a magnitude and a direction, which starts from a set 1st region (e.g., head) of the first image 301 and ends at a set 2nd region (e.g., head) of the second image 302.

In the same method, to detect the motion vectors of the person riding the bicycle who is the detected motion object, the electronic device can set a vector having a magnitude and a direction, which starts from a set 3rd region (e.g., seat) of the first image 301 and ends at a set 4th region (e.g., seat) of the second image 302.

In the same method, to detect the motion vectors of the person riding the bicycle who is the detected motion object, the electronic device can set a vector having a magnitude and a direction, which starts from a set 5th region (e.g., the center of a wheel) of the first image 301 and ends at a set 6th region (e.g., the center of a wheel) of the second image 302.

As illustrated in FIG. 3C, the electronic device can extract each of motion vectors 303, 304, and 305 of the motion objects 301 and 302.

The electronic device can extract motion vectors 303, 304, and 305 whose magnitudes and directions are located within set ranges 306, 307, and 308, and can extract an area 309 which includes the extracted motion vectors 303, 304, and 305 located within the set ranges 306, 307, and 308.

If it is determined that the extracted area 309 including the motion vectors 303, 304, and 305 located within the set ranges 306, 307, and 308 is equal to or is greater than a set area 310, the electronic device can confirm that image synthesis is unavailable. On the other hand, if it is determined that the extracted area 309 including the motion vectors 303, 304, and 305 located within the set ranges 306, 307, and 308 is less than the set area 310, the electronic device can confirm that the image synthesis is available.

In this embodiment, the extracted area 309 including the motion vectors 303, 304, and 305 located within the set ranges 306, 307, and 308 is greater than the set area 310. Accordingly, the electronic device can confirm that the two continuously captured images 301 and 302 are not synthesizable for use as wallpaper.

As illustrated in FIG. 3D, the electronic device can determine that a space for synthesizing the two continuously captured images 301 and 302 is insufficient and thus provide feedback that image synthesis is unavailable. For example, the electronic device can display a notification message of "Because motion objects of continuously captured images are big in size, synthesis is unavailable. Please take shot again." That is, the electronic device may display the notification message on a touch screen of the electronic device, or play back the aforementioned message through a speaker provided in the electronic device.

FIGS. 4A to 4D illustrate determining the effectiveness of image synthesis according to a third embodiment of the present disclosure. In the following, it is assumed that an electronic device continuously captures an image of a person, and starts determining the effectiveness of image synthesis for determining if two continuously captured images are synthesizable for use as wallpaper.

Referring to FIG. 4A, to determine the effectiveness of image synthesis, the electronic device can detect each of two continuously captured images. As illustrated in FIG. 4B, to detect motion vectors of a person who is a detected motion object, the electronic device can set a vector having a magnitude and a direction, which starts from a set 1st region (e.g., head) of the first image 401 and ends at a set 2nd region (e.g., head) of the second image 402.

In the same method, to detect the motion vectors of the person who is the detected motion object, the electronic device can set a vector having a magnitude and a direction, which starts from a set 3rd region (e.g., breast) of the first image 401 and ends at a set 4th region (e.g., breast) of the second image 402.

In the same method, to detect the motion vectors of the person who is the detected motion object, the electronic device can set a vector having a magnitude and a direction, which starts from a set 5th region (e.g., leg) of the first image 401 and ends at a set 6th region (e.g., leg) of the second image 402.

As illustrated in FIG. 4C, the electronic device can extract each of motion vectors 403, 404, and 405 of the first image 401 and the second image 402.

If it is determined that the extracted motion vectors 403, 404, and 405 are less than set magnitudes 406, 407, and 408, the electronic device can confirm that image synthesis is unavailable. On the other hand, if it is determined that the extracted motion vectors 403, 404, and 405 are greater than the set magnitudes 406, 407, and 408, the electronic device can confirm that the image synthesis is available.

In this embodiment, the extracted motion vectors 403, 404, and 405 are less than the set magnitudes 406, 407, and 408 and accordingly, the electronic device can confirm that the two continuously captured images 401 and 402 are not synthesizable for use as wallpaper.

After that, as illustrated in FIG. 4D, the electronic device can determine that there is no motion object in the continuously captured images 401 and 402 and thus, provide feedback that image synthesis is unavailable. For example, the electronic device can display a notification message of "Because there is no motion object in continuously captured images, synthesis is unavailable. Please take shot again." That is, the electronic device may display the notification message on a touch screen of the electronic device, or play back the aforementioned message through a speaker provided in the electronic device.

FIGS. 5A to 5D illustrate determining the effectiveness of image synthesis according to a fourth embodiment of the present disclosure. In the following, it is assumed that an electronic device continuously shoots a background including a motion object and a fixed object, and starts determining the effectiveness of image synthesis by determining if two continuously captured images are synthesizable for use as wallpaper. Also, it is assumed that, when judging from the electronic device, a sudden change of a location of the fixed object is sensed.

Figure 5A:
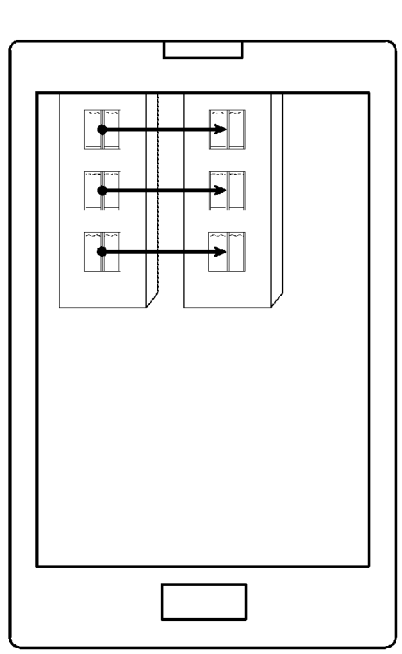
FIGS. 5A, 5B, 5C and 5D illustrate determining the effectiveness of image synthesis according to a fourth embodiment of the present disclosure.
Figure 5B:
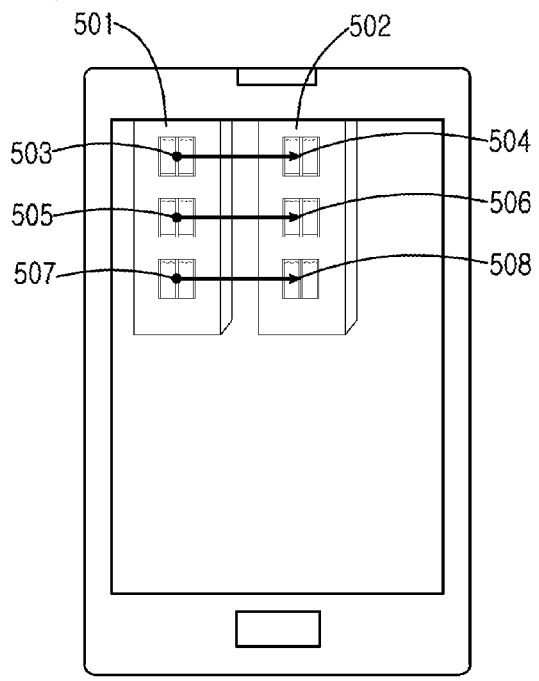

Referring to FIG. 5A, to determine the effectiveness of image synthesis, the electronic device can detect each of two continuously captured images. Next, as illustrated in FIG. 5B, to detect motion vectors of two fixed objects excepting the detected motion object, the electronic device can set a vector having a magnitude and a direction, which starts from a set 1st region 503 of the first image 501 and ends at a set 2nd region 504 of the second image 502.

In the same method, to detect motion vectors of the two fixed objects excepting the detected motion object, the electronic device can set a vector having a magnitude and a direction, which starts from a set 3rd region 505 of the first image 501 and ends at a set 4th region 506 of the second image 502.

In the same method, to detect motion vectors of the two fixed objects excepting the detected motion object, the electronic device can set a vector having a magnitude and a direction, which starts from a set 5th region 507 of the first image 501 and ends at a set 6th region 508 of the second image 502.

Figure 5C:
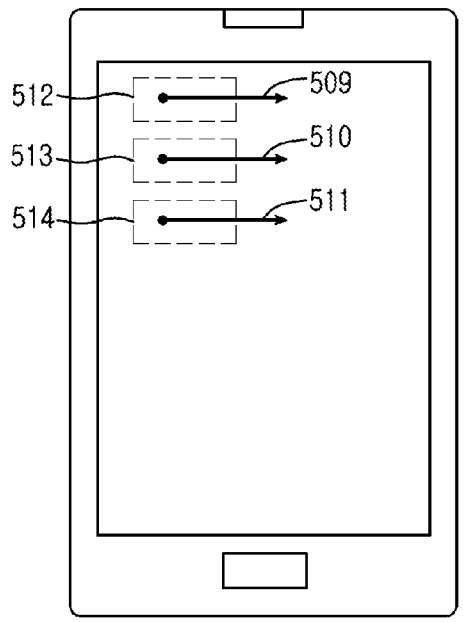

After that, as illustrated in FIG. 5C, the electronic device can extract motion vectors 509, 510, and 511 of the two fixed objects 501 and 502 excepting the detected motion object.

After that, if it is determined that the magnitudes and directions of the extracted motion vectors 509, 510, and 511 are out of set ranges 512, 513, and 514, the electronic device can confirm that the two continuously captured images are not synthesizable for use as wallpaper. On the other hand, if it is determined that the magnitudes and directions of the extracted motion vectors 509, 510, and 511 are within the set ranges 512, 513, and 514, the electronic device can confirm that the two continuously captured images are synthesizable for use as wallpaper.

In this embodiment, because the magnitudes and directions of the extracted motion vectors 509, 510, and 511 are out of the set ranges 512, 513, and 514, the electronic device can confirm that the continuously captured two fixed objects are not synthesizable for use as wallpaper.

Figure 5D:
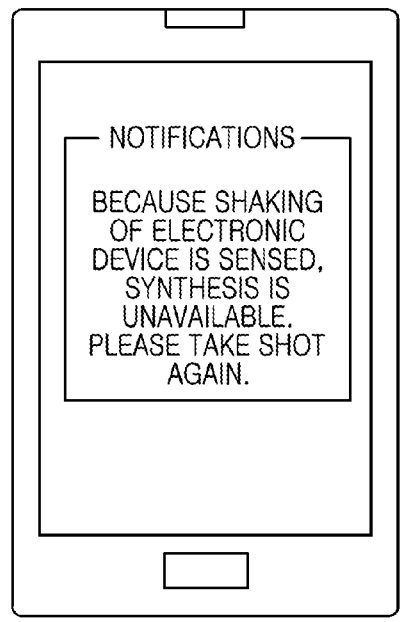

After that, as illustrated in FIG. 5D, the electronic device can provide feedback that image synthesis is unavailable, because the electronic device is shaken. For example, the electronic device can display a notification message of "Because shaking of electronic device is sensed, synthesis is unavailable. Please take shot again." That is, the electronic device may display the notification message on a touch screen of the electronic device, or play back the aforementioned message through a speaker provided in the electronic device.

Further, although not expressly mentioned in this embodiment, the electronic device may determine image synthesis or not, by sensing the shaking of the electronic device with a sensor provided in the electronic device. For example, if it is determined that a location change between a time when a continuous shot is started and a time when the continuous shot is ended is equal to or is greater than a threshold value by a sensor capable of sensing a location of the electronic device, the electronic device can determine that there is shaking of the electronic device, and confirm that the fixed objects are not synthesizable for use as wallpaper. On the other hand, if it is determined that the location change between the time point of starting the continuous shot and the time point of ending the continuous shot is less than the threshold value by the sensor capable of sensing the location of the electronic device, the electronic device can determine that there is no shaking of the electronic device, and confirm that the fixed objects are synthesizable for use as wallpaper.

Figure 6A:
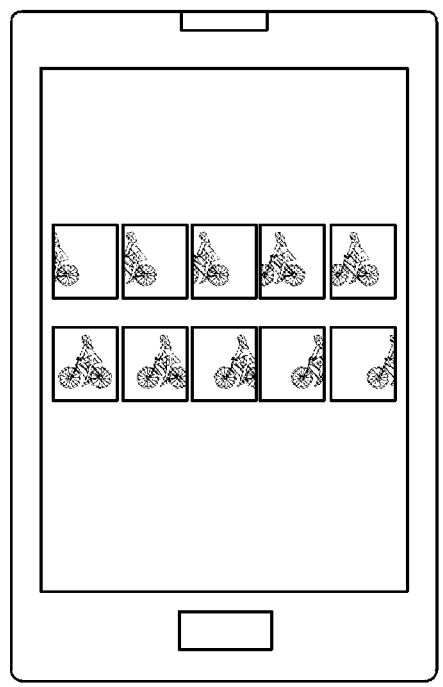
FIGS. 6A, 6B and 6C illustrate selecting plural images from continuously captured images and synthesizing the selected images according to an embodiment of the present disclosure.
Figure 6B:
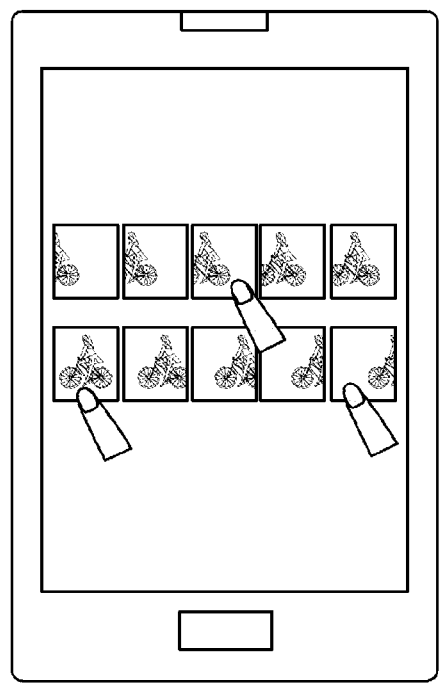
Figure 6C:
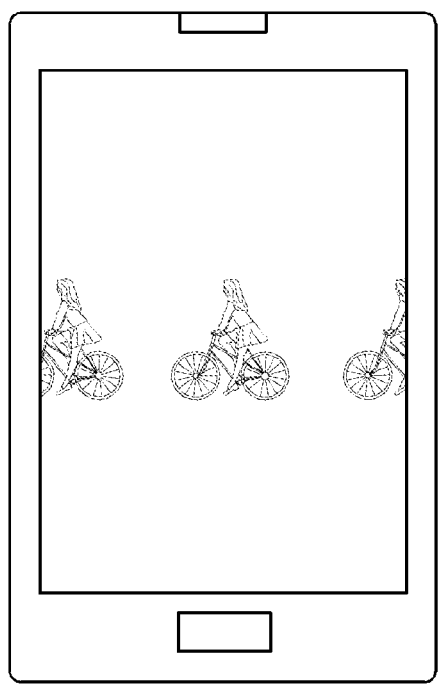

FIGS. 6A to 6C illustrate selecting plural images among continuously captured images and synthesizing the selected images according to an embodiment of the present disclosure. In the following, it is assumed that an electronic device continuously captures images of a person riding a bicycle, and that ten images satisfy the effectiveness of image synthesis as a result of determining the effectiveness of image synthesis of the continuously captured images.

Referring to FIG. 6A, the electronic device can display ten images satisfying the effectiveness of image synthesis among continuously captured images on a touch screen of the electronic device.

After that, as illustrated in FIG. 6B, the electronic device can receive a selection of two or more images among the ten images satisfying the effectiveness of image synthesis. An example in which the electronic device receives a selection of three images among the ten images is illustrated.

As illustrated in FIG. 6C, the electronic device can extract each of two or more motion objects included in the selected three images. For example, the electronic device can extract a motion object, which is the person riding the bicycle, included in the selected three images, from each of the selected three images. After that, the electronic device can synthesize each of the three extracted motion objects, respectively included in the selected three images, for use as wallpaper and display a synthesized image on the touch screen of the electronic device.

That is, the electronic device according to the present disclosure has an advantage of being capable of enlarging a user's choice and satisfying various desires of the user by not only automatically performing image synthesis but also receiving a selection of images to be used for the image synthesis directly from the user.

Figure 7A:
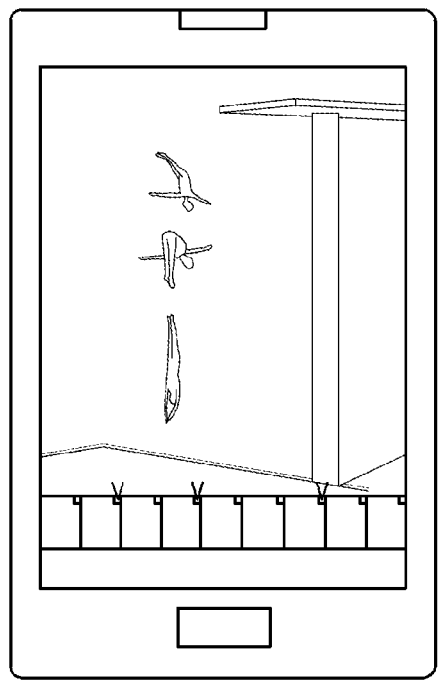
FIGS. 7A, 7B, and 7C illustrate deleting an object included in a synthesized image according to an embodiment of the present disclosure.
Figure 7B:
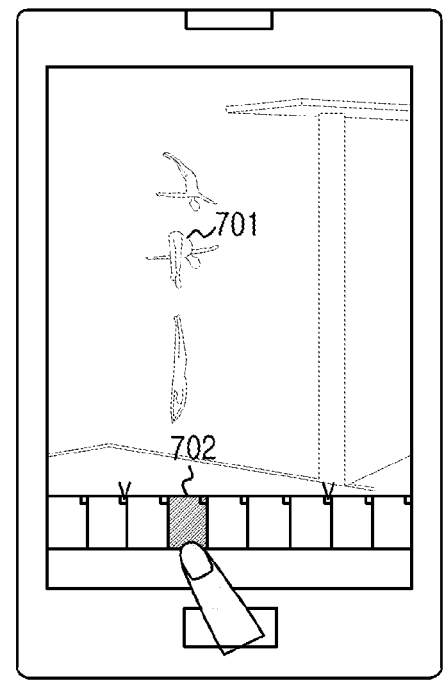
Figure 7C:
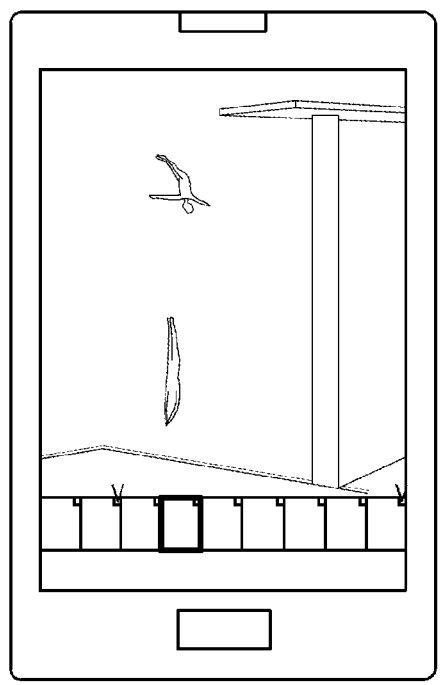

FIGS. 7A to 7C illustrate deleting an object included in a synthesized image according to an embodiment of the present disclosure. Although not illustrated in FIGS. 7A to 7C, when a user desires to edit an object while opening a synthesized image displayed on a touch screen of an electronic device, he/she can enter an editing mode and edit the synthesized image. That is, the electronic device can receive a selection of the editing mode capable of editing the synthesized image.

Referring to FIG. 7A, the electronic device can display two or more images synthesizable for use as wallpaper among continuously captured images, in a set region of the synthesized image. Here, the two or more images synthesizable for use as wallpaper can be defined as images satisfying the effectiveness of image synthesis among the continuously captured images.

Also, the electronic device can mark images having been used for image synthesis among the two or more images synthesizable for use as wallpaper. That is, the electronic device can perform a function of marking the images having been used for the image synthesis among the two or more images synthesizable for use as wallpaper, to clearly inform a user that they are images having been used for image synthesis.

When the user desires to delete a specific object from the synthesized image, he/she can select an image including the specific object from the two or more images synthesizable for use as wallpaper. For example, as illustrated in FIG. 7B, when the user desires to delete a secondly displayed object 701 from the synthesized image, he/she can select a secondly marked image 702 from the images displayed in the set region of the touch screen of the electronic device.

As illustrated in FIG. 7C, the electronic device can delete the object 701 corresponding to the selected image 702 from the synthesized image. Also, the electronic device can mark the selected image 702 by a dotted line, an outline, a specific color, and the like, thereby performing a function of informing the user that it is a selected image.

Figure 8A:
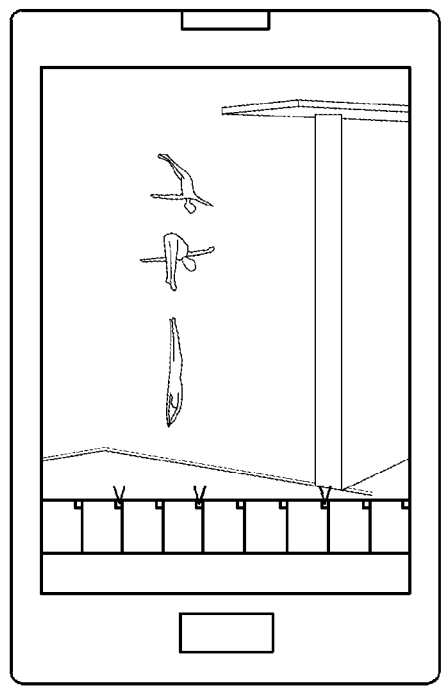
FIGS. 8A, 8B, and 8C illustrate adding an object to a synthesized image according to an embodiment of the present disclosure.
Figure 8B:
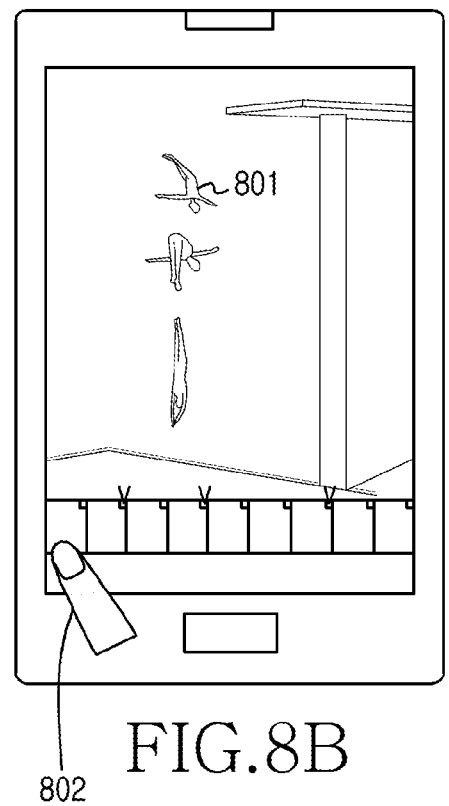
Figure 8C:
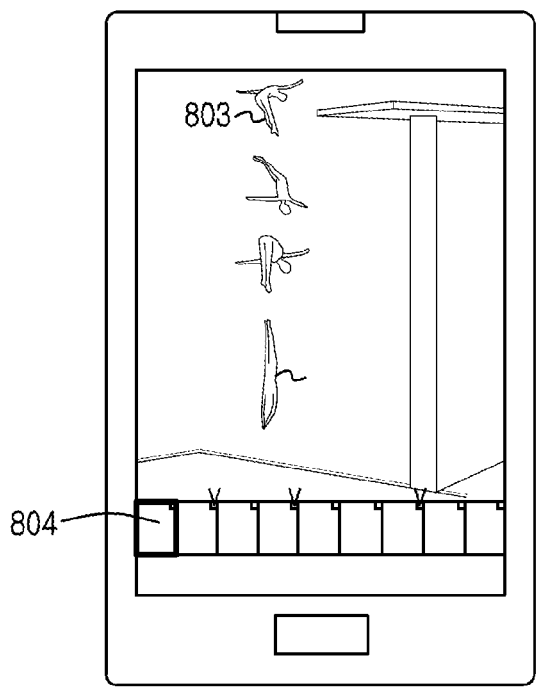

FIGS. 8A to 8C illustrate adding an object to a synthesized image according to an embodiment of the present disclosure. First, though not illustrated in FIGS. 8A to 8C, when a user desires to edit an object while opening a synthesized image displayed on a touch screen of an electronic device, he/she can enter an editing mode and edit the synthesized image. That is, the electronic device can receive a selection of the editing mode capable of editing the synthesized image.

Referring to FIG. 8A, the electronic device can display two or more images synthesizable for use as wallpaper among continuously captured images, in a set region of the synthesized image. Here, the two or more images synthesizable for use as wallpaper can be defined as images satisfying the effectiveness of image synthesis among the continuously captured images.

Also, the electronic device can mark images having been used for image synthesis among the two or more images synthesizable for use as wallpaper. That is, the electronic device can perform a function of marking the images having been used for the image synthesis among the two or more images synthesizable for use as wallpaper, to easily inform a user that they are images having been used for image synthesis.

When the user desires to add a specific object to the synthesized image, he/she can select an image including the specific object which he/she desires to add, from the two or more images synthesizable for use as wallpaper. For example, as illustrated in FIG. 8B, when the user desires to add a new object ahead of a firstly displayed object 801 among the synthesized image, he/she can select an image 802 located ahead of a firstly marked image, from the images displayed in the set region of the touch screen of the electronic device.

As illustrated in FIG. 8C, the electronic device can add the object 803 corresponding to the selected image 802, to the synthesized image. Also, the electronic device can mark the selected image 802 by a dotted line, an outline, a specific color, and the like, thereby performing a function of informing the user that it is a selected image.

Figure 9:
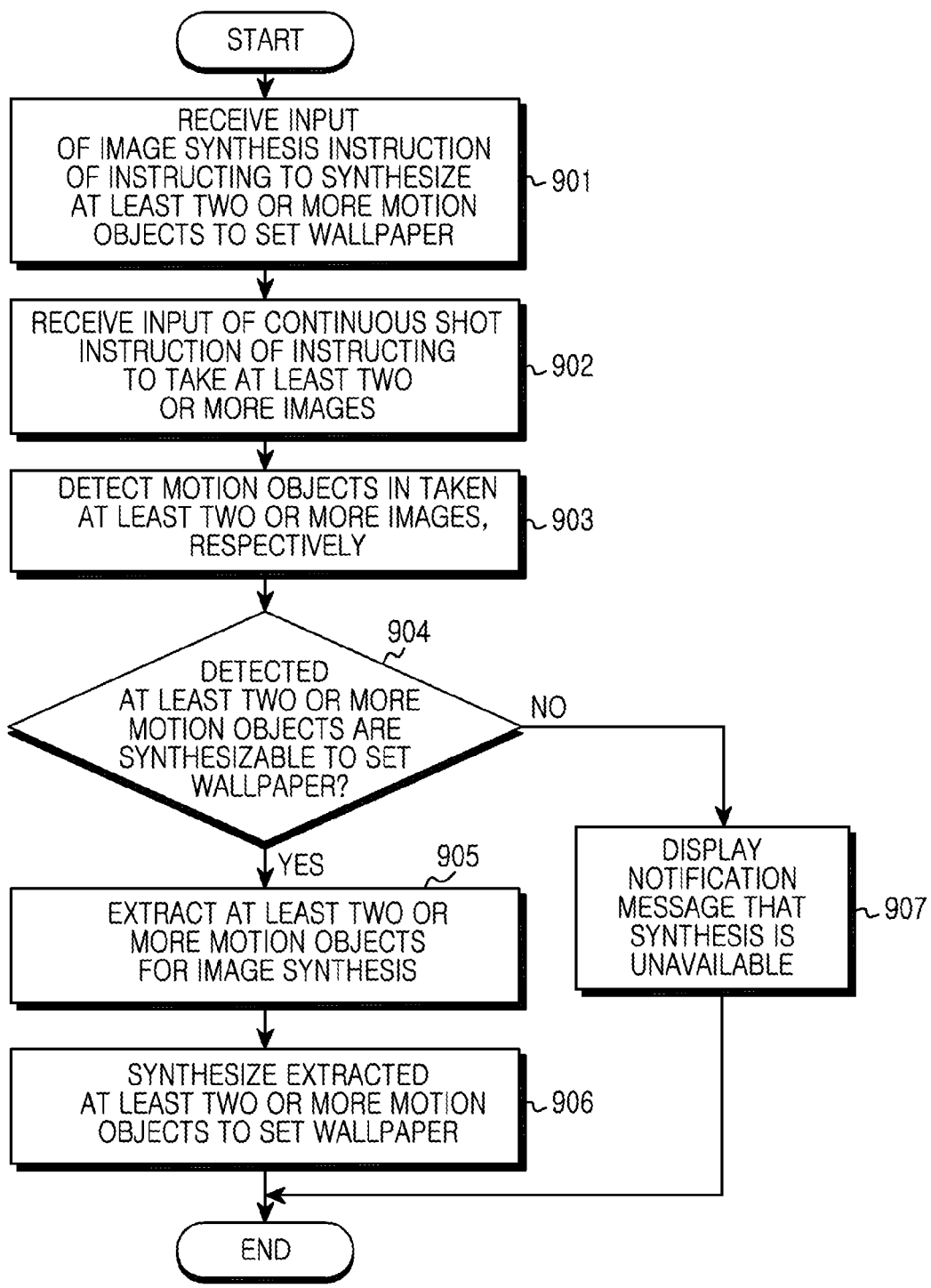
FIG. 9 is a flowchart illustrating an operation of an electronic device according to an embodiment of the present disclosure.

FIG. 9 is a flowchart illustrating an operation of an electronic device according to an embodiment of the present disclosure.

Referring to FIG. 9, in operation 901, the electronic device can receive an input of an image synthesis instruction of instructing to synthesize two or more motion objects for use as wallpaper. In more detail, after detecting the two or more motion objects in continuously captured images, the electronic device can receive an input of an image synthesis instruction of instructing to provide feedback according to whether the detected two or more motion objects are synthesizable for use as wallpaper.

In operation 902, the electronic device can receive an input of a continuous shot instruction of instructing to capture two or more images. If receiving the input of the continuous shot instruction, the electronic device can capture a set number of images within a set time.

In operation 903, the electronic device can detect motion objects in the captured two or more images, respectively. In more detail, the electronic device can detect motion objects among objects included in the captured two or more images, in the captured two or more images.

In operation 904, the electronic device detecting the motion objects in the captured two or more images can determine whether the detected two or more motion objects are synthesizable for use as wallpaper. In more detail, the electronic device can determine the effectiveness of synthesis for determining whether the detected two or more motion objects are synthesizable for use as wallpaper. For example, the electronic device can determine the effectiveness of image synthesis by determining whether there are plural motion objects, whether a motion object is bigger than a set size, whether no motion object is detected, whether a location of the electronic device is changed equal to or greater than a threshold value, and the like.

If it is determined in operation 904 that the detected two or more motion objects are synthesizable for use as wallpaper in the electronic device, in operation 905, the electronic device can extract the two or more motion objects from the captured two or more images for image synthesis. For example, it may be assumed that the electronic device detects seventy images, and the seventy images each include one motion object. Under the aforementioned assumption, the electronic device can extract seventy motion objects included in the seventy images, respectively.

In operation 906, the electronic device synthesizes the extracted two or more motion objects for use as wallpaper. Here, the set wallpaper may be either a screen designated by a user or a wallpaper of the first image among the continuously captured images. Desirably, the set wallpaper can be the wallpaper of the first image for clear image synthesis. After that, the electronic device can display a synthesized image on the touch screen of the electronic device and provide feedback.

On the other hand, if it is determined in operation 904 that the detected two or more motion objects are not synthesizable for use as wallpaper, in operation 907, the electronic device can display a notification message of not being synthesizable for use as wallpaper. In more detail, if the effectiveness of image synthesis is not recognized for the detected two or more motion objects, the electronic device can display a notification message of not being capable of performing the image synthesis on the touch screen of the electronic device, or play back the aforementioned message through a speaker provided in the electronic device.

The electronic device of the related art can include in one image each of motion objects included in continuously captured images in one image for use as wallpaper. However, the electronic device of the related art displays the plural images overlapping one another or otherwise unclearly because it is not able to determine the effectiveness of image synthesis, thus causing a failure to provide a clear image. The electronic device according to the present disclosure has an advantage of, because of previously determining the effectiveness of image synthesis, it is capable of automatically synthesizing images for which the effectiveness of synthesis is recognized, for use as wallpaper, and providing an image of a much higher quality. In addition, if it is determined that continuously captured images are not synthesizable in the electronic device, the electronic device can provide a user with feedback that the continuously captured images are not synthesizable, and lead the user to take a continuous shot again.

Figure 10A:
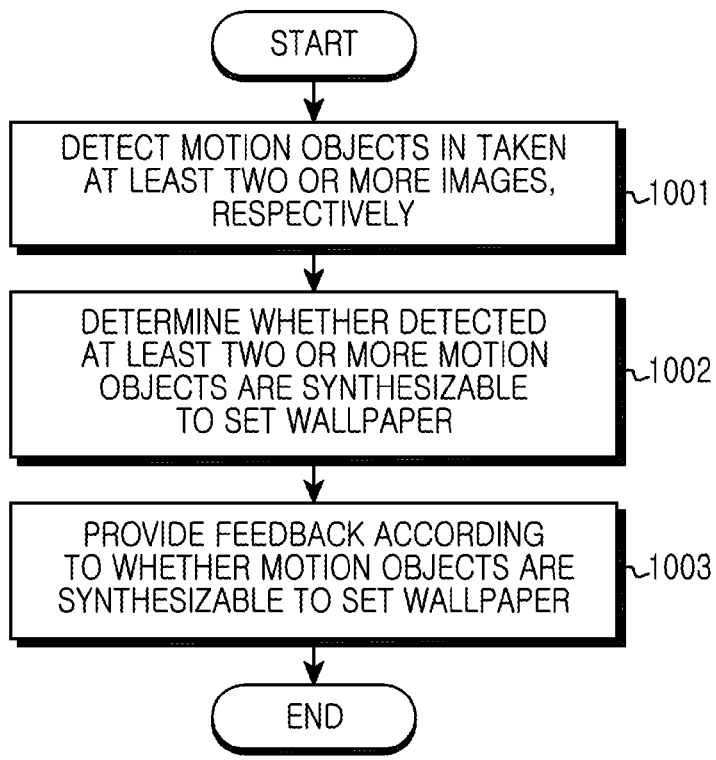
FIG. 10A is a flowchart illustrating a method of synthesizing continuously captured images in an electronic device according to an embodiment of the present disclosure.

FIG. 10A is a flowchart illustrating a method of synthesizing continuously captured images in an electronic device according to an embodiment of the present disclosure.

Referring to FIG. 10A, in operation 1001, the electronic device can detect motion objects in two or more captured images, respectively. In more detail, the electronic device can detect a motion object among objects included in the two or more captured images, in the two or more captured images. That is, the electronic device can detect the motion objects among the motion objects and fixed objects included in the two or more captured images.

In operation 1002, the electronic device can determine whether the detected two or more motion objects are synthesizable for use as wallpaper. In more detail, the electronic device can determine the effectiveness of synthesis for determining whether the detected two or more motion objects are synthesizable for use as wallpaper. For example, the electronic device can determine the effectiveness of image synthesis by determining whether there are plural motion objects, whether a motion object is bigger than a set size, whether no motion object is detected, whether a location of the electronic device is changed equal to or greater than a threshold value, and the like.

In operation 1003, the electronic device can provide feedback according to whether the detected two or more motion objects are synthesizable for use as wallpaper. In more detail, if the effectiveness of image synthesis is recognized as a result of determining the effectiveness of image synthesis in the electronic device, the electronic device can display a synthesized image on a touch screen of the electronic device. On the other hand, if the effectiveness of image synthesis is not recognized, the electronic device can provide feedback that the image synthesis is unavailable.

Figure 10B:
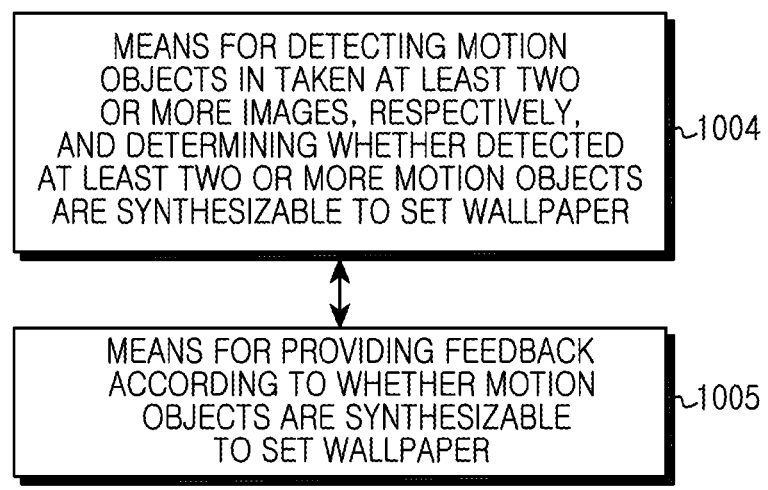
FIG. 10B is a diagram illustrating an apparatus for synthesizing continuously captured images in an electronic device according to an embodiment of the present disclosure.

FIG. 10B is a diagram illustrating an apparatus for synthesizing continuously captured images in an electronic device according to an embodiment of the present disclosure.

Referring to FIG. 10B, a processor unit 1004 of the electronic device can detect motion objects in two or more captured images, respectively, and determine whether the detected two or more motion objects are synthesizable for use as wallpaper. That is, after detecting the motion objects in the two or more continuously captured images, respectively, the processor unit of the electronic device can determine the effectiveness of image synthesis for the detected motion objects.

A touch screen 1005 of the electronic device can provide feedback according to whether the detected two or more motion objects are synthesizable for use as wallpaper. If the effectiveness of image synthesis is recognized, the touch screen of the electronic device can display a synthesized image. On the other hand, if the effectiveness of image synthesis is not recognized, the touch screen of the electronic device can display a notification message of not being capable of performing the image synthesis.

Figure 11:
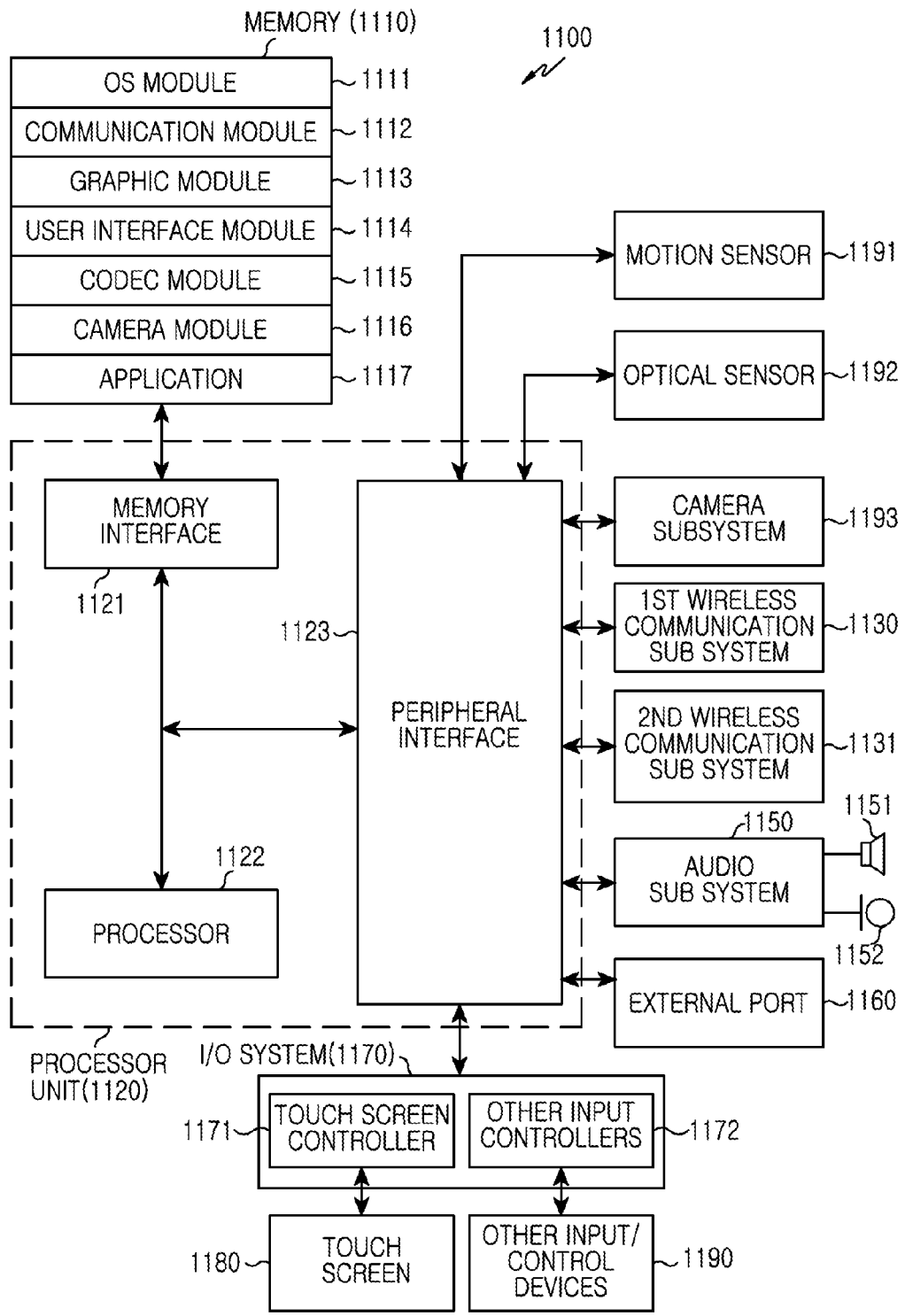
FIG. 11 is a block diagram illustrating a construction of an electronic device according to an embodiment of the present disclosure.

FIG. 11 is a block diagram illustrating a construction of an electronic device according to an embodiment of the present disclosure.

Referring to FIG. 11, the electronic device 1100 can be a portable electronic device, and can be a device such as a portable terminal, a mobile phone, a mobile pad, a media player, a tablet computer, a handheld computer, or a Personal Digital Assistant (PDA). Also, the electronic device may be any portable electronic device including a device having a combination of two or more functions among these devices.

The electronic device 1100 includes a memory 1110, a processor unit 1120, a 1st wireless communication sub system 1130, a 2nd wireless communication sub system 1131, an audio sub system 1150, a speaker 1151, a microphone 1152, an external port 1160, an Input Output (IO) sub system 1170, a touch screen 1180, and other input or control devices 1190. The memory 1110 and the external port 1160 can be provided in plurality.

The processor unit 1120 can include a memory interface 1121, one or more processors 1122, and a peripheral interface 1123. According to various embodiments, the entire processor unit 1120 is also called a processor. In the present disclosure, the processor unit 1120 can detect motion objects in two or more captured images, respectively, and determine whether the detected two or more motion objects are synthesizable for use as wallpaper.

Also, the processor unit 1120 can extract motion vectors of motion objects among the detected two or more motion objects, and determine whether the extracted motion vectors of the motion objects are located within set ranges. If it is determined that the motion vectors of the motion objects are located within the set ranges, the processor unit 1120 can determine that there is one motion object in the continuously captured images, and confirm that the motion objects are synthesizable for use as wallpaper. If it is determined that the motion vectors of the motion objects are located out of the set ranges, the processor unit 1120 can determine that there are two or more motion objects in the continuously captured images, and confirm that the motion objects are not synthesizable for use as wallpaper.

Also, the processor unit 1120 can extract the motion vectors of the motion objects among the detected two or more motion objects, extract motion vectors whose magnitudes and directions are located within set ranges from the extracted motion vectors, and extract an area including the extracted motion vectors located within the set ranges. If it is determined that the extracted area is equal to or is greater than a set area, the processor unit 1120 can confirm that the motion objects are not synthesizable for use as wallpaper. If it is determined that the extracted area is less than the set area, the processor unit 1120 can confirm that the motion objects are synthesizable for use as wallpaper.

Also, the processor unit 1120 can extract the motion vectors of the motion objects among the detected two or more motion objects. If it is determined that the magnitudes of the extracted motion vectors are less than set magnitudes, the processor unit 1120 can determine that there is no motion object in the continuously captured images, and confirm that the motion objects are not synthesizable for use as wallpaper. If it is determined that the magnitudes of the extracted motion vectors are equal to or are greater than the set magnitudes, the processor unit 1120 can determine that there are motion objects in the continuously captured images, and confirm that the motion objects are synthesizable for use as wallpaper.

Also, the processor unit 1120 can extract motion vectors of fixed objects excepting the detected two or more motion objects. If it is determined that the magnitudes and directions of the extracted motion vectors are located out of set ranges, the processor unit 1120 can confirm that the motion objects are not synthesizable for use as wallpaper. If it is determined that the magnitudes and directions of the extracted motion vectors are located within the set ranges, the processor unit 1120 can confirm that the motion objects are synthesizable for use as wallpaper.

Also, if it is determined by a location sensing sensor that a location change between a time point at the beginning of a continuous shot and a time point at the end of the continuous shot is equal to or is greater than a threshold value, the processor unit 1120 can confirm that the motion objects are not synthesizable for use as wallpaper. If it is determined that the location change between the time point at the beginning of the continuous shot and the time point at the end of the continuous shot is less than the threshold value, the processor unit 1120 can confirm that the motion objects are synthesizable for use as wallpaper.

Also, if it is determined that the detected two or more motion objects are synthesizable for use as wallpaper, the processor unit 1120 can synthesize the detected two or more motion objects for use as wallpaper.

Also, the processor unit 1120 can extract two or more motion objects included in selected images, respectively. Also, the processor unit 1120 can delete a motion object included in a selected image, from a synthesized image. Also, the processor unit 1120 can add a motion object included in a selected image, to the synthesized image.

The processor 1122 executes various software programs and performs various functions for the electronic device 1100, and also performs processing and control for voice communication and data communication. In addition to this general function, the processor 1122 plays a role of executing a specific software module (i.e., an instruction set) stored in the memory 1110 and performing various functions corresponding to the software module. That is, the processor 1122 interworks with the software modules stored in the memory 1110 and carries out a method of an embodiment of the present disclosure.

The processor 1122 can include one or more data processors, image processors, or COder/DECoders (CODECs). The data processor, the image processor, or the CODEC may be constructed separately. Also, the processor 1122 may be composed of several processors performing different functions. The peripheral interface 1123 connects the IO sub system 1170 of the electronic device 1100 and various peripheral devices thereof to the processor 1122 and to the memory 1110 through the memory interface 1121.

Various constituent elements of the electronic device 1100 can be coupled with one another by one or more communication buses (not denoted by reference numerals) or stream lines (not denoted by reference numerals).

The external port 1160 directly connects a portable electronic device (not shown) to other electronic devices or indirectly connects to other electronic devices over a network (for example, the Internet, an intranet, a Wireless Local Area Network (WLAN) and the like). For example, the external port 1160 refers to, though not limited to, a Universal Serial Bus (USB) port, a FIREWIRE port or the like.

A motion sensor 1191 and an optical sensor 1192 are coupled to the peripheral interface 1123 and enable various functions. For instance, the motion sensor 1191 and the optical sensor 1192 can be coupled to the peripheral interface 1123 to sense a motion of the electronic device 1100 and sense light from the exterior, respectively. In addition to this, a global positioning system and other sensors such as a temperature sensor or a biological sensor can be coupled to the peripheral interface 1123 and perform related functions.

A camera sub system 1193 can perform a camera function such as photo and video clip recording.

The optical sensor 1192 can use a Charged Coupled Device (CCD) device or Complementary Metal-Oxide Semiconductor (CMOS) device.

A communication function is performed through one or more wireless communication sub systems 1130 and 1131. The 1st wireless communication sub system 1130 and the 2nd wireless communication sub system 1131 can include a radio frequency receiver and transceiver and/or an optical (e.g., infrared) receiver and transceiver. The 1st wireless communication sub system 1130 and the 2nd wireless communication sub system 1131 can be distinguished according to a communication network in which the electronic device 1100 communicates. For example, the communication network can include a communication sub system designed to operate through, though not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Wireless interoperability for Microwave Access (WiMAX) network, a Bluetooth network or/and the like. The 1st wireless communication sub system 1130 and the 2nd wireless communication sub system 1131 may be coupled and constructed as one wireless communication sub system.

The audio sub system 1150 can be coupled to the speaker 1151 and the microphone 1152 to take charge of input and output of an audio stream such as voice recognition, voice replication, digital recording, and phone function. That is, the audio sub system 1150 communicates with a user through the speaker 1151 and the microphone 1152. The audio sub system 1150 receives a data stream through the peripheral interface 1123 of the processor unit 1120, converts the received data stream into an electric stream, and forwards the converted electric stream to the speaker 1151. The speaker 1151 converts the electric stream into human-audible sound waves and outputs the converted sound waves. The microphone 1152 converts sound waves forwarded from human or other sound sources into electric streams. The audio sub system 1150 receives the converted electric streams from the microphone 1152. The audio sub system 1150 converts the received electric streams into audio data streams, and transmits the converted audio data streams to the peripheral interface 1123. The audio sub system 1150 can include a detachable earphone, headphone or headset.

The IO sub system 1170 can include a touch screen controller 1171 and/or other input controller 1172. The touch screen controller 1171 can be coupled to the touch screen 1180. The touch screen 1180 and the touch screen controller 1171 can detect a contact and a motion or an interruption thereof, by using, though not limited to, not only capacitive, resistive, infrared and surface acoustic wave technologies for determining one or more contact points with the touch screen 1180 but also any multi-touch sensing technology including other proximity sensor arrays or other elements. The other input controller 1172 can be coupled to the other input/control devices 1190. The other input/control devices 1190 can be at least one or more buttons, a rocker switch, a thumb-wheel, a dial, a stick, a pointer device such as a stylus and/or the like.

The touch screen 1180 provides an input output interface between the electronic device 1100 and a user. That is, the touch screen 1180 forwards a user's touch input to the electronic device 1100. Also, the touch screen 1180 is a medium for showing an output of the electronic device 1100 to the user. That is, the touch screen 1180 shows a visual output to the user. This visual output can be presented in form of a text, a graphic, a video, and a combination thereof.

The touch screen 1180 can use any of various displays. For example, the touch screen 1180 can use, though is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), and the like. In the present disclosure, the touch screen 1180 can provide feedback according to whether two or more motion objects are synthesizable for use as wallpaper. Also, the touch screen 1180 can receive an input of an image synthesis instruction of instructing to synthesize the two or more motion objects for use as wallpaper. To detect the two or more motion objects, the touch screen 1180 can receive an input of a continuous shot instruction of instructing to take two or more images.

Also, if it is determined that the motion objects are not synthesizable for use as wallpaper, the touch screen 1180 can provide feedback that synthesis is unavailable. Also, the touch screen 1180 can display a synthesis image synthesizing the two or more motion objects for use as wallpaper.

Also, if it is determined that the motion objects are synthesizable for use as wallpaper, the touch screen 1180 can display two or more images synthesizable for use as wallpaper among continuously captured images, receive a selection of two or more images among the displayed two or more images, synthesize the extracted two or more objects for use as wallpaper, and display a synthesized image.

Also, the touch screen 1180 can display in a set region of the synthesized image the two or more images synthesizable for use as wallpaper among the continuously captured images, and receive a selection of at least one image among the displayed two or more images.

The memory 1110 can be coupled to the memory interface 1121. The memory 1110 can include high-speed random access memory and/or non-volatile memory such as one or more magnetic disk storage devices, one or more optical storage devices, and/or flash memories (for example, Not AND (NAND) memories, Not OR (NOR) memories).

The memory 1110 stores software. A software constituent element includes an OS module 1111, a communication module 1112, a graphic module 1113, a user interface module 1114, an MPEG module 1115, a camera module 1116, one or more application modules 1117 and the like. Also, because the module, the software constituent element, can be expressed as a set of instructions, the module is also called an instruction set. The module is also called a program. The OS module 1111 (for example, an embedded operating system such as WINDOWS, LINUX, Darwin, RTXC, UNIX, OS X, or VxWorks) includes various software constituent elements controlling general system operation. Control of the general system operation represents memory management and control, storage hardware (device) control and management, power control and management and the like. This OS software performs even a function of making smooth communication between various hardware (devices) and software constituent elements (modules).

The communication module 1112 can enable communication with other electronic device such as a computer, a server, a portable terminal and/or the like, through the 1st and 2nd wireless communication sub systems 1130 and 1131 or the external port 1160.

The graphic module 1113 includes various software constituent elements for providing and displaying a graphic on the touch screen 1180. The term 'graphic' may denote a text, a web page, an icon, a digital image, a video, an animation, and the like.

The user interface module 1114 includes various software constituent elements associated with a user interface. Further, the user interface module 1114 includes information about how a state of the user interface is changed and in which conditions the change of the state of the user interface is carried out, and the like.

The CODEC module 1115 can include a software constituent element related to encoding of a video file and decoding thereof. The CODEC module 1115 can include a video stream module such as an MPEG module and/or H204 module. Also, the CODEC module can include several audio file CODEC modules such as AAA, AMR, WMA and the like. Also, the CODEC module 1115 includes an instruction set corresponding to an implementation method of the present disclosure.

The camera module 1116 includes a camera-related software constituent element enabling camera-related processes and functions.

The application module 1117 may include a browser, an electronic mail (e-mail), an instant message, word processing, keyboard emulation, an address book, a touch list, a widget, Digital Right Management (DRM), voice recognition, voice replication, a position determining function, a location-based service and the like.

Also, various functions of the electronic device 1100 according to the present disclosure mentioned above can be executed by hardware including one or more stream processing and/or Application Specific Integrated Circuits (ASICs), and/or software, and/or a combination of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
    obtaining a plurality of consecutive images including a moving object from a camera operatively coupled with the electronic device;
    obtaining motion vectors concerning the moving object from the plurality of consecutive images;
    determining, based on the obtained motion vectors, a plurality of first images satisfying effectiveness of image synthesis among the plurality of consecutive images;
    displaying the determined plurality of first images on a first region of a screen of the electronic device;
    detecting touch selections of two or more images among the plurality of first images displayed on the first region of the screen;
    synthesizing the touch selected two or more images to generate a synthesized image; and
    displaying the generated synthesized image on a second region, separated from the first region, of the screen,
    wherein the determining of the plurality of first images comprises:
        determining whether the motion vectors obtained from two sequential images are located within a set range;
        if it is determined that the motion vectors obtained from the two sequential images are located out of the set range, determining that the two sequential images do not satisfy the effectiveness of image synthesis; and
        if it is determined that the motion vectors obtained from the two sequential images are located within the set range, determining that the two sequential images satisfy the effectiveness of image synthesis.

2. The method of claim 1, wherein the determined plurality of first images are arranged in a row.

3. The method of claim 1,
    wherein the screen is rectangular with four sides,
    wherein the first region of the screen is disposed in the vicinity of one side of the four sides.

4. An electronic device comprising:
    a screen; and
    a processor operatively coupled with the screen, the processor configured to:
        obtain a plurality of consecutive images including a moving object from a camera operatively coupled with the electronic device,
        obtain motion vectors concerning the moving object from the plurality of consecutive images,
        determine, based on the obtained motion vectors, a plurality of first images satisfying effectiveness of image synthesis among the plurality of consecutive images,
        display the determined plurality of first images on a first region of the screen, detect touch selections of two or more images among the plurality of first images displayed on the first region of the screen, synthesize the touch selected two or more images to generate a synthesized image, and display the generated synthesized image on a second region, separated from the first region, of the screen, wherein, when determining the plurality of first images, the processor is further configured to:

determine whether the motion vectors obtained from two sequential images are located within a set range, if it is determined that the motion vectors are located out of the set range, determine that the two sequential images do not satisfy the effectiveness of image synthesis, and if it is determined that the motion vectors are located within the set range, determine that the two sequential images satisfy the effectiveness of image synthesis.

5. The device of claim 4, wherein the determined plurality of first images are arranged in a row.

6. The device of claim 4, wherein the screen is rectangular with four sides, wherein the first region of the screen is disposed in the vicinity of one side of the four sides.

* * * * *